United States Patent
Padmanabhan et al.

(10) Patent No.: US 6,385,579 B1
(45) Date of Patent: May 7, 2002

(54) METHODS AND APPARATUS FOR FORMING COMPOUND WORDS FOR USE IN A CONTINUOUS SPEECH RECOGNITION SYSTEM

(75) Inventors: Mukund Padmanabhan, White Plains; George Andrei Saon, Putnam Valley, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/302,032

(22) Filed: Apr. 29, 1999

(51) Int. Cl.$^7$ .......................... G10L 15/06; G10L 15/14
(52) U.S. Cl. ....................... 704/243; 704/256
(58) Field of Search ................. 704/243–245, 704/235, 255–257

(56) References Cited

U.S. PATENT DOCUMENTS

| | | | |
|---|---|---|---|
| 5,502,791 A | * 3/1996 | Nishimura et al. | 704/256 |
| 5,761,687 A | * 6/1998 | Hon et al. | 704/246 |
| 5,835,888 A | * 11/1998 | Kanevsky et al. | 704/243 |
| 5,839,106 A | * 11/1998 | Bellegarda | 704/257 |
| 6,009,392 A | * 12/1999 | Kanevsky et al. | 704/245 |
| 6,154,722 A | * 11/2000 | Bellegarda | 704/257 |

OTHER PUBLICATIONS

M. Finke et al., "Flexible Transcription Alignment," IEEE Workshop on Speech Recognition and Understanding, pp. 1–7, Santa Barbara, CA, 1997.

M. Finke et al., "Speaking Mode Dependent Pronunciation Modeling in Large Vocabulary Conversational Speech Recognition," Proceedings of Eurospeech' 97, pp. 1–4, Rhodos, Greece, 1997.

E.P. Giachin et al., "Word Juncture Modeling Using Phonological Rules for HMM–based Continuous Speech Recognition," Computer, Speech and Language, 5:155–168, 1991.

* cited by examiner

Primary Examiner—David D. Knepper
(74) Attorney, Agent, or Firm—Ryan, Mason & Lewis, LLP; Paul J. Otterstedt

(57) ABSTRACT

A method of forming an augmented textual training corpus with compound words for use with an associated with a speech recognition system includes computing a measure for a consecutive word pair in the training corpus. The measure is then compared to a threshold value. The consecutive word pair is replaced in the training corpus with a corresponding compound word depending on the result of the comparison between the measure and the threshold value. One or more measures may be employed. A first measure is an average of a direct bigram probability value and a reverse bigram probability value. A second measure is based on mutual information between the words in the pair. A third measure is based on a comparison of the number of times a co-articulated baseform for the pair is preferred over a concatenation of non-co-articulated individual baseforms of the words forming the pair. A fourth measure is based on a difference between an average phone recognition score for a particular compound word and a sum of respective average phone recognition scores of the words of the pair.

41 Claims, 3 Drawing Sheets

FIG. 4A

| ITERATION | NO. OF WORDS | EXAMPLES | PERPLEXITY | WER |
|---|---|---|---|---|
| 0 | 0 | | 78 | 39.42% |
| 1 | 42 | AREA-CODE, GIVE-ME, A-CALL, THIS-IS, E-MAIL, LITTLE-BIT, TAKE-CARE | 103 | 37.45% |
| 2 | 19 | GIVE-ME-A-CALL, LET-ME-KNOW, AS-SOON-AS, THANK-YOU-VERY-MUCH | 114 | 36.79% |
| 3 | 9 | TALK-TO-YOU-LATER-BYE, THANKS-A-LOT, PLEASE-GIVE-ME-A-CALL | 117 | 36.64% |

FIG. 4B

MUTUAL INFORMATION (LM$_2$)

| ITERATION | EXAMPLES | PERPLEXITY | WER |
|---|---|---|---|
| 1 | AREA-CODE, LITTLE-BIT, E-MAIL, TAKE-CARE, SET-UP, GO-AHEAD | 86 | 39.31% |
| 2 | AS-SOON-AS, I'M-NOT-SURE, PLEASE-GIVE-ME, HAVE-ANY-QUESTIONS | 91 | 39.47% |
| 3 | LET-ME-KNOW, MY-NUMBER-IS, LEAVE-ME, PLEASE-GIVE-ME-A, THANKS-BYE | 93 | 39.26% |

COARTICULATION MEASURE (AC$_1$)

| ITERATION | EXAMPLES | PERPLEXITY | WER |
|---|---|---|---|
| 1 | ABOUT-IT, AND-THAT, AS-SOON, COULD-YOU, DON'T-KNOW, GOING-TO | 89 | 39.31% |

AVERAGE PHONE PROBABILITY DIFFERENCE (AC$_2$)

| ITERATION | EXAMPLES | PERPLEXITY | WER |
|---|---|---|---|
| 1 | NUMBER-IS, THIS-IS, YOU-GET, TO-DO, PLEASE-GIVE, NEED-TO, IF-YOU | 108 | 39.42% |
| 2 | LET-YOU-KNOW, TALK-TO-YOU, GOING-TO-BE, TO-YOU-LATER, EIGHT-SIX | 122 | 39.26% |
| 3 | PLEASE-GIVE-ME-A-CALL, TALK-TO-YOU-LATER, WE-CAN, I'M-AT, BYE-BYE | 134 | 39.26% |

FIG. 4C

| EXAMPLES | PERPLEXITY | WER |
|---|---|---|
| AREA-CODE, BYE-BYE, GIVE-ME-A-CALL, GOING-TO, WANT-TO, KIND-OF PHONE-MAIL, TALK-TO-YOU-LATER, EIGHTY-SIX, HAVE-A-NICE-DAY | 110 | 36.86% |

METHODS AND APPARATUS FOR FORMING COMPOUND WORDS FOR USE IN A CONTINUOUS SPEECH RECOGNITION SYSTEM

The invention was made at least in part with Government support under grant contract no. MDA972-97-C-0012 awarded by the Defense Advanced Research Project Agency (DARPA) of the U.S. Department of Defense. The Government has certain rights in the invention.

FIELD OF THE INVENTION

The present invention relates generally to speech recognition systems and, more particularly, to methods and apparatus for forming compound words for use in speech recognition systems.

BACKGROUND OF THE INVENTION

It is an established fact that the pronunciation variability of words is greater in spontaneous, conversational speech as compared to the case of carefully read speech where the uttered words are closer to their canonical representations, i.e., baseforms. Whereas most of the speech recognition systems have focused on the latter case, there is no standard solution for dealing with the variability present in the former case. One can argue that by increasing the vocabulary of alternate pronunciations of words, i.e., acoustic vocabulary, most of the speech variability can be captured in the spontaneous case. However, an increase in the size of alternate pronunciations is typically followed by an increase in acoustic confusion between words since different words can end up having close or even identical pronunciation variants. It should be understood that the phrase "acoustic confusion" is also referred to herein as "confusability" and refers to the propensity of a speech recognition system to confuse words due to pronunciation variants.

Consider the word "TO" which when preceded by a word such as "GOING" is often pronounced as the baseform AX. That is, instead of a user uttering the phrase "GOING TO," the user may utter the phrase "GONNA," which may have baseforms such as G AA N AX or G AO N AX. It is well known that words may have more than one baseform since a word may be pronounced a number of ways. For instance, a vowel in a word may be pronounced as a short vowel (e.g., "A" as AX) or a long vowel (e.g., "A" as AY). Another example of the word "TO" being pronounced as AX is when the phrase "WANT TO" is uttered as "WANNA" (W AA N AX or W AO N AX).

However, in the above two examples, merely adding the baseform AX to the vocabularies of the speech recognition system for the word "TO" would lead to confusion with the word "A" for which baseform AX is the standard pronunciation.

On the other hand, most co-articulation effects, as the above two examples illustrate, arise at the boundary between adjacent words and can often be predicted based on the identity of these words. These co-articulation effects result in alterations of the last one or two phones of the first word and the first phone of the second word. These phones can undergo hard changes (e.g., substitutions or deletions) or soft changes, the latter ones being efficiently modeled by context dependent phones.

The use of crossword phonological rewriting rules was first proposed in E. P. Giachin et al., "Word Juncture Modeling Using Phonological Rules for HMM-based Continuous Speech Recognition," Computer, Speech and Language, 5:155–168, 1991, the disclosure of which is incorporated herein by reference, and provides a systematic way of taking into account co-articulation phenomena such as geminate or plosive deletion (e.g., "WENT TO" resulting in W EH N T UW), palatization (e.g., "GOT YOU" resulting in G AO CH AX), etc.

Yet, another known way of dealing with co-articulation effects at word boundaries is to merge specific pairs of words into single compound words or multi-words and to provide special co-articulated pronunciation variants for these new tokens. For instance, frequently occurring word pairs such as "KIND OF", "LET ME" and "LET YOU" can be viewed as single words KIND-OF, LET-ME and LET-YOU, which are often pronounced K AY N D AX, L EH M IY and "L EH CH AX," respectively. A major reason for merging frequently co-occurring words into compound words is to tie confusable words to other words. The resulting phone sequences will be longer and therefore more likely to be recognized by the acoustic component of the speech recognition system. For instance, the word "AS" by itself is particularly confusable in spontaneous speech, but the sequence AS-SOON-AS is far more difficult to be mis-recognized.

As mentioned previously, indiscriminately adding more tokens (compound words) to the acoustic vocabulary and/or the language model will increase the confusability between words. The candidate pairs for compound words have to be chosen carefully in order to avoid this increase. Intuitively, such a pair has to meet several requirements:

1. The pair of words has to occur frequently in the training corpus. There is no gain in adding a pair with a low occurrence count (i.e., the number of times the word pair occurs in the training corpus) to the vocabulary since the chances of encountering that pair during the decoding of unseen data will be low. Besides, the compound word issued from this pair will contribute to the acoustic confusability of other words which are more probable according to the language model.
2. The words within the pair have to occur frequently together and more rarely in the pair context of other words. This requirement is necessary since one very frequent word a can be part of several different frequent pairs, e.g., $(a, b_1), \ldots, (b_{n+1}, a), \ldots, (b_m, a)$. If all these pairs were to be added to the vocabulary, then the confusability between $b_i$ and the pair $(a, b_i)$ or $(b_i, a)$ would be increased especially if word a has a short phone sequence. This will result in insertions or deletions of the word a when incorrectly decoding the word $b_i$ or the sequence $b_i$–a or a–$b_i$.
3. The words should ideally present co-articulation effects at the juncture, meaning that their continuous pronunciation should be different than when they are uttered in isolation. This requirement is not always compatible with the previous ones, meaning that the word pairs which have the strongest co-articulation effects do not necessarily occur very often nor do the individual words occur only together.

The use of compound words (or multi-words) was first suggested in M Finke et al., "Speaking Mode Dependent Pronunciation Modeling in Large Vocabulary Conversational Speech Recognition," Proceedings of Eurospeech '97, Rhodos, Greece, 1997 and M. Finke, "Flexible Transcription Alignment," 1997 IEEE Workshop on Speech Recognition and Understanding, Santa Barbara, Calif., 1997, the disclosures of which are herein incorporated by reference. These articles propose two measures for finding candidate pairs. The first measure is language model oriented and consists of maximizing the mutual information between two words while decreasing the bigram perplexity of the augmented language model (by these tokens) on the training corpus. It is to be appreciated that perplexity measures the quality of the language model and may be represented as:

$$Perp = e^{-\frac{1}{N}\log P(C)}, \quad (1)$$

where C represents the training corpus, N represents the number of words in corpus C, and P(C) represents the probability of the corpus C according to the language model. A low perplexity value translates to a better language model. Bigram perplexity refers to the perplexity of a language model with bigram probabilities and may be represented as:

$$P(C) = \prod_{i=1}^{N} P(w_i \mid w_{i-1}), \quad (2)$$

where $C = w_1, \ldots, w_N$. Even though the mutual information between two words is a good measure with respect to the second requirement above, the minimization of the perplexity is in contradiction with the first (and most important) requirement. Indeed, according to the first requirement, frequent pairs are good candidates for compound words. The language model, built by adjoining these pairs to the existing vocabulary, will present a higher perplexity on the training data since the bigram count for every pair (which was high) has been taken out by merging the pair into a single (compound) word. In other words, the prediction power of the language model without compound words is stronger (or the perplexity lower) because it can often predict the second word given the first word of a frequently seen pair. It may be readily shown that the perplexity of the resulting language model increases whenever frequent pairs are added to the vocabulary.

The second measure that the Finke articles disclose is related to pronunciation modeling at word boundaries. The articles propose measuring the reduction in entropy between the co-articulated pronunciation variants of a hypothesized compound word and the variants of the individual words. The pair which gives the maximum reduction will be merged into a compound word and all the instances of that pair in the training data will be replaced by this new word.

SUMMARY OF THE INVENTION

The present invention provides for methods and apparatus for improving recognition performance in a speech recognition system by, for example, more accurately modeling pronunciation variability at boundaries between adjacent words in a continuously spoken utterance. Such improved modeling is accomplished according to the invention by introducing new language model measures and acoustic measures for determining whether candidate element sets (two or more individual elements) in the training corpus should form a compound element.

In a first aspect of the invention, a method of forming an augmented textual corpus associated with a speech recognition system includes computing a measure for an element set in a textual corpus for comparison to a threshold value, the measure being an average of a direct n-gram probability value and a reverse n-gram probability value. Then, the element set in the textual corpus is replaced with a compound element depending on a result of the comparison between the measure and the threshold value. For example, if the element set is a consecutive pair of words, the average of a direct bigram probability value and a reverse bigram probability value is computed. If the measure is not less than the threshold value, a compound word replaces the consecutive pair of words in the corpus.

The compound element may also be added to a language model vocabulary and an acoustic vocabulary associated with the speech recognition system. Further, the augmented training corpus may be used to recompute a language model and retrain an acoustic model, each associated with the system.

In a second aspect of the invention, a measure used in the comparison may be based on mutual information between elements in the set. In a third aspect of the invention, a measure may be based on a comparison of the number of times a co-articulated baseform for the set is preferred over a concatenation of non-co-articulated individual baseforms of the elements forming the set. In a fourth aspect of the invention, a measure may be based on a difference between an average phone recognition score for a particular compound element and a sum of respective average phone recognition scores of the elements of the set.

It is to be appreciated that a speech recognition system augmented by compound elements according to the invention produces a decoded sequence associated with the augmented textual corpus.

It is to be further appreciated that while a detailed description of the invention is described below in terms of forming a compound word from a pair of consecutive words in a training corpus, the invention more generally provides for forming a compound element from two or more individual elements of the training corpus. An element may be a full word or one or more phones that are not necessarily full words.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative speech recognition system. However, it is to be understood that the present invention is not limited to this or any particular speech recognition system. Rather, the invention is more generally applicable to any speech recognition system in which it is desirable to realize improved continuous speech recognition performance through the addition of compound words to the language model vocabulary and/or the acoustic vocabulary of the system. By way of example only, generalized speech recognition systems such as the commercially available large vocabulary IBM ViaVoice or ViaVoice Gold systems (trademarks of IBM Corporation of Armonk, N.Y.) may be adapted to permit and/or perform compound word formation in accordance with the invention.

Figure 1:
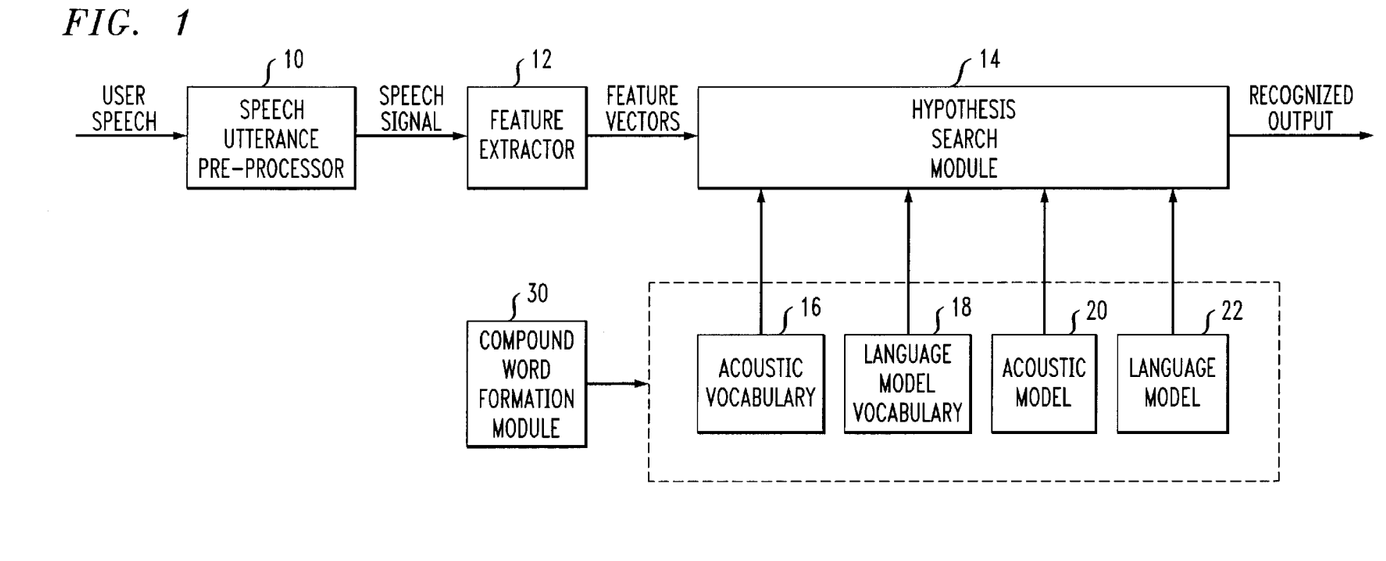
FIG. 1 is a block diagram of an illustrative speech recognition system employing a compound word forming methodology according to the invention.

Referring initially to FIG. 1, a block diagram of an illustrative speech recognition system employing a compound word forming methodology according to the invention is shown. Before explaining an illustrative compound word forming embodiment of the invention, a brief explanation of the functionality of the components of the illustrative speech recognition system will now be given. A speech utterance pre-processor 10 receives the speech uttered by a user and generates representative speech waveforms, i.e., a speech signal. The speech utterance pre-processor 10 may include, for example, an audio-to-analog transducer (microphone) and an analog-to-digital converter which respectively transduce the utterances into an electrical signal and then convert the electrical signal into a digital signal representative of the speech uttered. Further, the pre-processor may sample the speech signal and partition the signal into overlapping frames so that each frame is discretely processed by the remainder of the system. The output signal of the pre-processor 10 is the sampled speech waveforms or speech signal which is recorded and provided to a feature extractor 12.

The feature extractor 12 receives the speech signal and, as is known in the art, extracts spectral features from the signal at regular intervals, for example, about every 10 milliseconds. The spectral features are in the form of feature vectors (signals) which are then passed on to a hypothesis search module 14.

The hypothesis search routine performed by the module 14 is substantially controlled by four components: (i) an acoustic vocabulary 16; (ii) a language model vocabulary 18; (iii) an acoustic model 20; and (iv) a language model 22. Specifically, the hypothesis search routine hypothesizes a sequence of words from the acoustic vocabulary 16 and computes a score for the hypothesis. Subsequently, the hypothesis with the best score is output as the recognized or decoded sequence. The process of computing the score consists of two steps: (i) computing an acoustic model score; and (ii) computing a language model score. The language model score is related to linguistic constraints and tries to capture the grammatical constraints in the particular language. For example, the word sequence "GIVE ME A CALL" is given a higher probability than the word sequence "GIVE A CALL ME." The acoustic model score relates to the probability distribution of the feature vectors for a given hypothesis. The probability of a sequence of feature vectors is computed using a parameterized probability density function, and this constitutes the acoustic model score. The acoustic and language vocabularies 16 and 18 define the words that can be used to construct the hypothesis.

A compound word formation module 30, as shown in FIG. 1, performs the methodologies of the invention, as will be illustratively explained below, to change the acoustic and/or language model vocabularies 16 and 18, which in turn affect the acoustic and/or language models 20 and 22, to improve continuous speech recognition performance.

Figure 2:
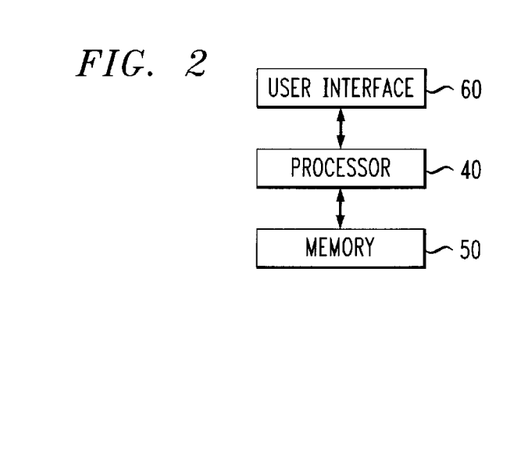
FIG. 2 is a block diagram of an illustrative hardware implementation of speech recognition system employing a compound word forming methodology according to the invention.

Referring now to FIG. 2, a block diagram of an illustrative hardware implementation of a speech recognition system employing a compound word forming methodology according to the invention (e.g., as illustrated in FIG. 1) is shown. In this particular implementation, a processor 40 for controlling and performing speech recognition and compound word formation is coupled to a memory 50 and a user interface 60. It is to be appreciated that the term "processor" as used herein is intended to include any processing device, such as, for example, one that includes a CPU (central processing unit). For example, the processor may be a digital signal process or, as is known in the art. Also the term "processor" may refer to more than one individual processor. The term "memory" as used herein is intended to include memory, associated with a processor or CPU, such as, for example, RAM, ROM, a fixed memory device (e.g., hard drive), a removable memory device (e.g., diskette), etc. In addition, the term "user interface" as used herein is intended to include, for example, one or more input devices, e.g., keyboard, for inputting data to the. processing unit, and/or one or more output devices, e.g., CRT display and/or printer, for providing results associated with the processing unit. The user inter-face 60 may also include a portion of the speech utterance pre-processor 10 (FIG. 1) such as the microphone for receiving user speech.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIG. 1 may be implemented in various forms of hardware, software, or combinations thereof, e.g., one or more digital signal processors with associated memory, application specific integrated circuit(s), functional circuitry, one or more appropriately programmed general purpose digital computers with associacted memory, etc. Given the teachings of the invention provided herein, one of ordinary skill in the related art will be able to contemplate other implementations of the elements of the invention.

Given the above-described illustrative speech recognition system, an illustrative method of forming compound words for inclusion in the language model and acoustic vocabularies of such a system will now be explained. The invention provides for computation of language model measures and acoustic measures which are used for determining whether to form a compound word from two or more individual words in a training corpus. The formed compound words are then added to the vocabularies and the associated models (acoustic and language) are updated to reflect the newly added words or tokens in the vocabularies. First, the computation of these new measures will be explained followed by an illustrative method for employing such measures.

The following measures can be broadly classified into language model oriented measures or acoustic oriented measures respectively depending on whether the information that is being used is entirely textual or includes acoustic confusability such as phone recognition rate or a co-articulated versus a non-co-articulated baseform (or word pronunciation variant or lexeme) recognition rate.

Language Model Measures

Let us first denote $W_1, \ldots, W_t, \ldots, W_N$ as the word transcriptions of a training corpus. The training corpus may be stored in memory 50 (FIG. 2). We define a direct bigram probability between the words $W_i$ and $w_j$ as:

$$P(W_{t+1}=w_j | W_t=w_i), \quad (3)$$

and a reverse bigram probability as:

$$P(W_t=w_i | W_{t+1}=w_j). \quad (4)$$

Both quantities can be respectively estimated from the training corpus by counting the number of times that $w_i$ is followed by $w_j$ divided by the number of occurrences of $w_i$ (for the direct bigram) and by counting the number of times that $w_j$ is preceded by $w_i$ divided by the number of occurrences of $w_j$ (for the reverse bigram). Thus, the direct bigram probability may be estimated as:

$$P(w_j \mid w_i) = \frac{\sum_{t=1 \, s.t. \, W_t = w_i \text{ and } W_{t-1} = w_j}^{N-1} 1}{\sum_{t=1 \, s.t. \, W_t = w_i}^{N-1} 1}, \quad (5)$$

while the reverse bigram probability may be estimated as:

$$P(w_i \mid w_j) = \frac{\sum_{t=1 \, s.t. \, W_{t+1} = w_j \text{ and } W_t = w_i}^{N-1} 1}{\sum_{t=1 \, s.t. \, W_{t-1} = w_j}^{N-1} 1}, \quad (6)$$

where the abbreviation s.t. represents the phrase "such that." The first measure that we introduce is the geometrical average between the direct and the reverse bigram:

$$LM_1(w_i, w_j) = \sqrt{P(w_j \mid w_i)P(w_i \mid w_j)} = \frac{P(w_i, w_j)}{\sqrt{P(w_i)P(w_j)}}. \quad (7)$$

Note that $0 \leq LM_1(w_i, w_j) \leq 1$ for every pair of words $(w_i, w_j)$. A high value for $LM_1(w_i, w_j)$ means that both the direct and the reverse bigrams are high for $(w_i, w_j)$. Otherwise stated, the probabilities that $w_i$ is followed by $w_j$ and $w_j$ is preceded by $w_i$ are high which makes the pair a good candidate for a compound word according to our second requirement previously described in the background section. It is to be appreciated that the invention preferably takes into account one or more of the four requirements described in the background section. In one embodiment of the invention, as will be explained in the context of FIG. 3, all the pairs of words for which this measure is greater than a fixed threshold and for which the pair occurrence count is greater than another fixed threshold (e.g., following the first requirement previously described in the background section) are turned into compound words.

A second measure is based on the mutual information between two words and can be defined as:

$$LM_2(w_i, w_j) = \log \frac{P(w_j \mid w_i)}{P(w_j)} = \log \frac{P(w_i, w_j)}{P(w_i)P(w_j)}. \quad (8)$$

Intuitively, a high mutual information between two words means that they often occur together in the training corpus (the pair count is comparable with the individual counts). Again, this second new measure ($LM_2$) is similar in application to the previous measure ($LM_1$) in the sense that the pairs which score more than a fixed threshold become compound words both for the acoustic and for the language model vocabulary.

It can be observed that neither the bigram product measure nor the mutual information take into account co-articulation effects at word boundaries, since they are language model oriented measures. These co-articulation effects have to be added explicitly for the pairs which become compound words according to these metrics or measures, either by using phonological rewriting rules or by manually designing co-articulated baseforms where appropriate.

In the case of phonological rewriting rules, the last phone of the first word and the first phone of the second word are considered and a phone for the compound word is generated. For example, according to the geminate deletion rule, if the last phone of the first word is T, D, K, P, B or G and the first phone of the second word is T, D, K, P, B or G. respectively, then the compound word would use a single phone T, D, K, P, B or G. respectively. An example of this would be "TAKE CARE." Further, according to the palatization rule, if the last phone of the first word is T or D and the first phone of the second word is Y, then the compound word would use a single phone CH or JH, respectively. An example of this would be "DID YOU." In the case of manual editing, co-articulation effects can be added by listening to the possible pronunciation variants of the compound word and designing co-articulated baseforms accordingly.

Acoustic Measures

The second set of new measures of the invention consider explicit acoustic information when designing compound words and thus are referred to as acoustic measures. The first acoustic measure deals explicitly with co-articulation phenomena and may be defined as follows. For the pairs of words in the training corpus which present such phenomena according to the applicability of at least one phonological rewriting rule, one can compare the number of times that a co-articulated baseform for the pair is preferred over a concatenation of non-co-articulated individual baseforms of the words forming that pair in the training corpus. If the ratio between these two counts is larger than a threshold, then the pair is turned into a compound word. The decision of choosing the co-articulated pair baseform versus the concatenation of individual baseforms is based on the acoustic Viterbi score for a region of the training data which is aligned to the pair. The counts are performed over all the occurrences of the pair. Consider, for example, the words "TAKE" with baseform T EY KD and "CARE" with baseform K EH R and the co-articulated baseform T EY K EH R (according to the geminate deletion rule, e.g., delete one K). The $AC_1(w_i, w_j)$ measure for this example would be:

$$AC_1(TAKE, CARE) = \frac{\#(T \, EY \, K \, EH \, R)}{\#(T \, EY \, KD \, K \, EH \, R)} \quad (9)$$

where # refers to "the number of times." In one embodiment, if $AC_1(w_i, w_j) \geq 1$ then $(w_i, w_j)$ becomes a compound word. Thus, the first-acoustic measure is based on a comparison between the number of times that a co-articulated baseform (e.g., T EY K EH R) is preferred by the acoustic component of the recognition system (i.e., higher Viterbi score) over the concatenation of non-co-articulated baseforms of the individual words (T EY KD +K EH R).

The second new acoustic measure is more related to the acoustic confusability of a word. Let us assume that word $w_1$ has a low average phone recognition score (or probability). One would expect that, by tying $w_1$ to a word $w_2$ which presents a higher phone recognition score, the compound word $w_1$–$w_2$ (or $w_2$–$w_1$) would have a higher phone recognition score and thus a lower acoustic confusability. We will consider the maximum score over all pronunciation variants of word w:

$$P(w) = \max_{bsf \in w} \left[ \prod_{phone \in bsf} P_{rec}(phone) \right]^{\frac{1}{|bsf|}}, \quad (10)$$

where bsf means baseform, lexeme, or pronunciation variant (e.g., a sequence of phones), and define the following measure:

$$AC_2(w_i, w_j) = \log P(w_i - w_j) - (\log P(w_i) + \log P(w_j)). \quad (11)$$

Again, this measure is maximized in the case of a hypothesized compound word. Thus, this second acoustic measure $AC_2$ represents a difference between the logarithm of the average phone recognition probability of the compound word and the sum of the logarithms of the average phone recognition probabilities of the individual words.

Figure 3:
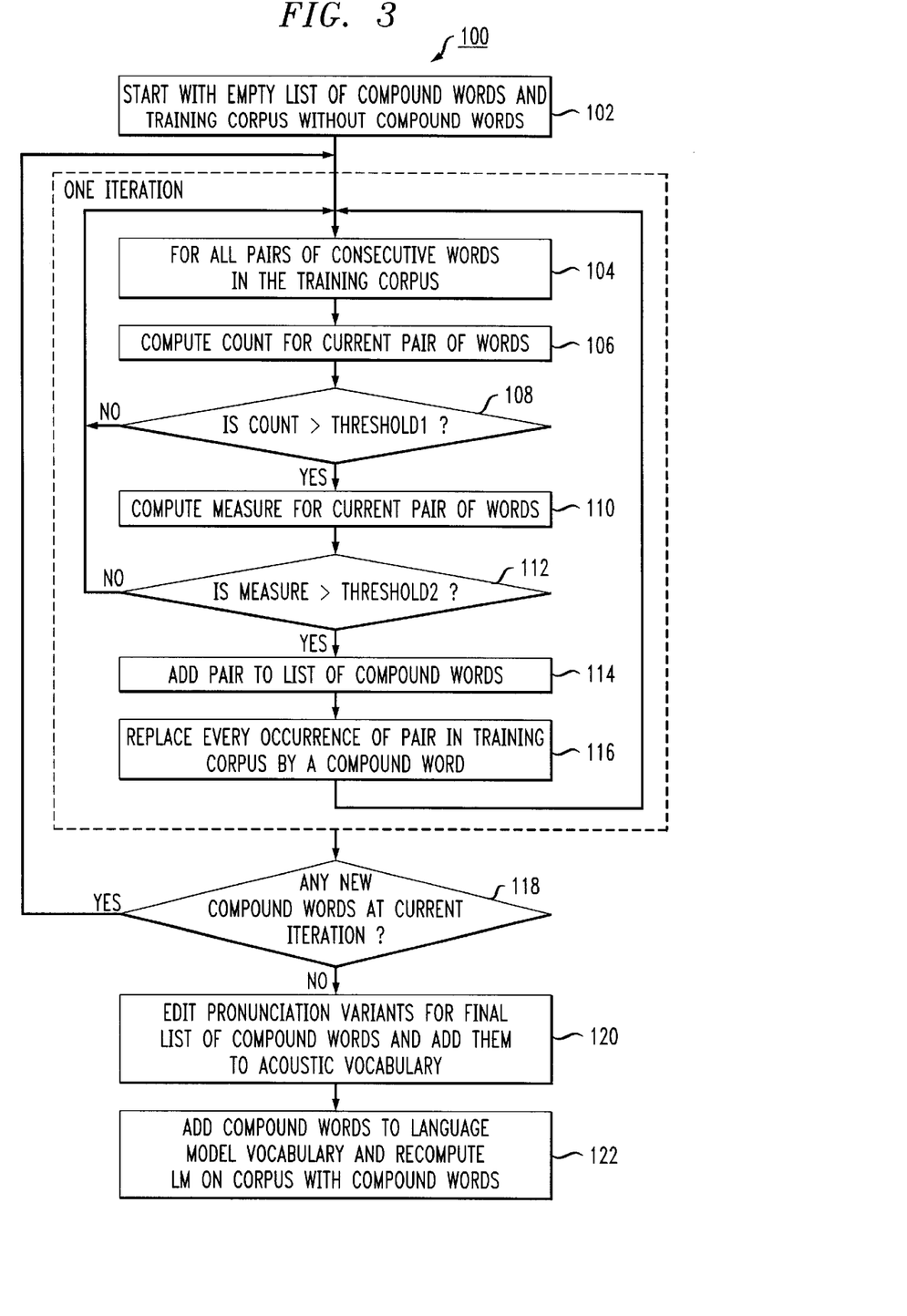
FIG. 3 is a flow diagram of an illustrative compound word forming methodology according to the invention.

Referring now to FIG. 3, a flow diagram of an illustrative compound word forming methodology according to the invention is shown. It is to be appreciated that the term "measure" as used in accordance with the illustrative method 100 of FIG. 3 is intended to generally refer to any one of the four new measures of the invention explained herein, i.e., $LM_1$, $LM_2$, $AC_1$, or $AC_2$. That is, the steps of FIG. 3 may be performed for each measure such that each measure is independently employed in making a determination as to the formation of compound words from a textual training corpus. However, it is to be understood that two or more of the measures may be employed when making such determination in order to jointly realize the individual benefits that derive from the use of each individual measure.

Step 102 starts with an empty list of compound words and a training corpus without any compound word augmentation. For all pairs of consecutive words in the training corpus (step 104), step 106 computes a pair occurrence count or pair count for the current pair of consecutive words. As mentioned, the pair occurrence count is the number of times that a pair occurs in the training corpus. The pair count for the current pair of words is then compared to a first predetermined threshold value (Threshold1) in step 108. If the count is not greater than Threshold1, then the process returns to step 104 to consider the next consecutive word pair. However, if the pair count for the current pair is greater than Threshold1, a measure ($LM_1$, $LM_2$, $AC_1$, and/or $AC_2$) is computed for the current pair in step 110.

Figure 4A:
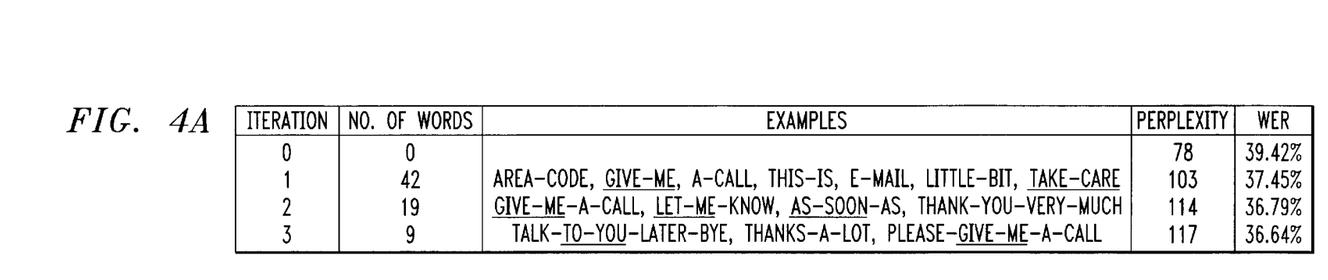
FIGS. 4A through 4C are tabular representations of experimental results associated with compound word formation.
Figure 4B:
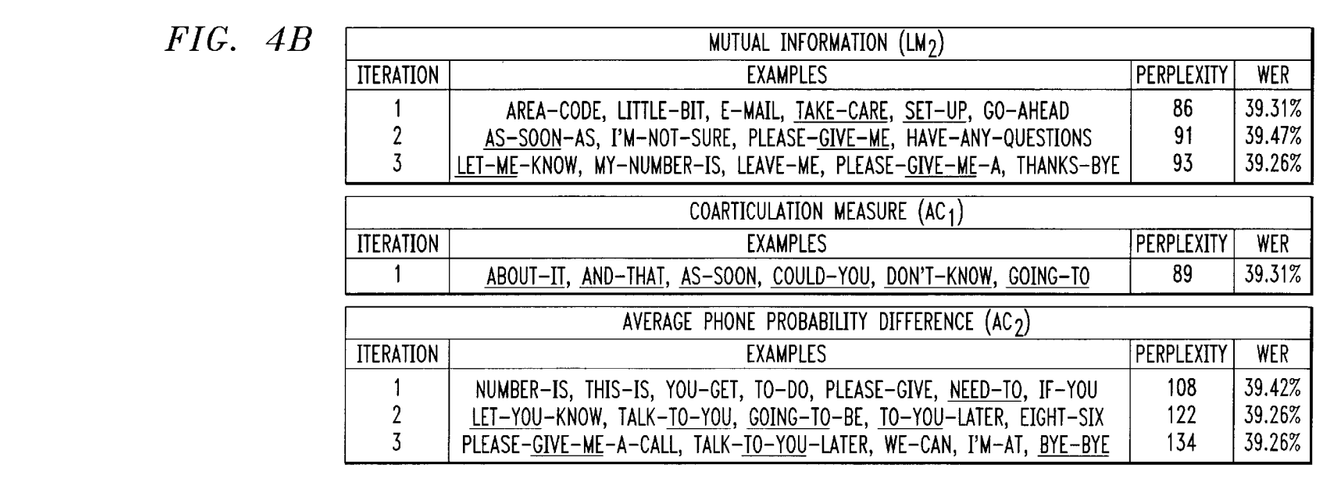
Figure 4C:
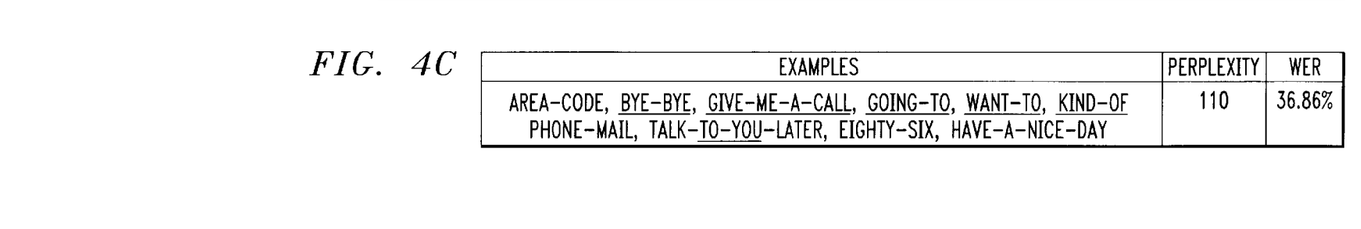

Step 112 compares the computed measure to a second predetermnined threshold value (Threshold2). If the measure is not greater than Threshold2, then the process returns to step 104 to consider the next consecutive word pair. However, if the computed measure for the current pair is greater than Threshold2, the pair is added to the list of compound words in step 114. Step 116 replaces every occurrence of the consecutive word pair in the training corpus by a compound word formed therefrom, e.g., the consecutive word pair "AREA" and "CODE" is replaced by the compound word "AREA-CODE." Other examples of compound words are shown in FIGS. 4A through 4C. The process then returns to step 104 to consider the next consecutive word pair.

As shown in this illustrative method, steps 104 through 116 comprise a single iteration. The method 100 may repeat steps 104 through 116 for multiple iterations. After each iteration, step 118 determines if any compound words were formed during that iteration. If compound words were formed, steps 104 through 116 may be repeated in yet another iteration. However, once no new compound words are formed in the current iteration, it is assumed that all consecutive word pairs of interest have been replaced by respective compound words in the training corpus. Then, step 120 edits pronunciation variants for the final list of compound words. The final list is the cumulative list of compound words formed in the one or more iterations. The pronunciation variants of the compound words are then added to the acoustic vocabulary. Step 122 then adds the compound words to the language model vocabulary and recomputes the language model on the training corpus with the compound words. The acoustic model may be retrained by a user with the augmented training corpus, language model and acoustic vocabulary. Thus, once the associated speech recognition system is augmented with compound words formed according to the invention, recognition performance may be substantially improved.

For exarnple, after the training corpus, language model and acoustic vocabulary have been augmented with compound words, the hypothesis search module 14 (FIG. 1) of the speech recognition system may perform improved recognition as follows. The system may compute a score for a hypothesized sequence using the augmented language model and augmented acoustic vocabulary. The hypothesized sequence resulting in the highest score is output as the decoded sequence. Thus, the output of the speech recognition system is a sequence of elements or words associated with the augmented textual corpus.

It is to be appreciated that while the illustrative method 100 provides for updating both the acoustic vocabulary and the language model vocabulary according to the compound words, it is possible to only update one or the other. For example, the compound words may be added to the acoustic vocabulary alone while keeping separate words in the language model vocabulary. Then, the acoustic score of the compound word will be combined with the language model score of the individual words during the search. The same is true if the compound words are only added to the language model vocabulary and not the acoustic vocabulary.

Experimental Results

Experiments were performed on a telephony voicemail database system comprising about 40 hours of speech and 400 k words of text. The size of the vocabulary for the application is 14 k words. The results are reported on a set of 43 voicemail messages (roughly 2000 words).

The experimental setup is as follows. Every measure was applied in an iterative way. After one iteration, the pairs which score more than a threshold were transformed into compound words and all instances of the pairs in the training corpus were replaced by these new words. Both the acoustic vocabulary and the language model vocabulary were augmented by these words after each step.

For the first language model measure based on the product between the direct and the reverse bigram, the constraints were $LM_1(w_i, w_j) > 0.2$ and $P(w_i, w_j) > 2.5 \times 10^{-4}$. $P(w_i, w_j)$ is the count of the pair $w_i$, $w_j$ divided by the number of words (or pairs) in the corpus, that is, $100/400\,k = 2.5 \times 10^{-4}$. FIG. 4A summarizes the number of new compound words obtained after each iteration, examples of such words, and the word error rate (WER), as well as the perplexity of the test set. The words which present co-articulated baseforms are underscored.

If we do not take into account co-articulation effects for the word pairs found by $LM_2$ after the third iteration, then the new word error rate becomes 38.36% (compared to 36.64%). Consequently, more than half of the improvement comes from merging confusable words to other words with which they occur frequently but a great part (almost 40%) is related to the modeling of co-articulated pronunciation at the word boundaries.

For the remaining measures, the thresholds were set such as to obtain the same number of words (or pairs) after each iteration as for the $LM_1$ case. In this way, it is possible to provide a fair comparison between the performances of the different measures. The threshold on the pair count was set to 100 for $LM_2$ and $AC_2$ (or $P(w_i, w_j) > 2.5 \times 10^{-4}$) and to 300 for $AC_1$. The performances of these measures are illustrated in FIG. 4B. As can be seen, WER improvement when using these other measures is slightly less than the improvement realized in accordance with $LM_1$. The bigram product measure $LM_1$, outperforms the mutual information because the word pairs which are chosen according to $LM_1$, get more counts (which means they are more frequent) than those preferred by $LM_2$. However, for the same number of pairs after the first iteration (42), the difference in perplexity is significant between the two language models. Still, $LM_1$ and $LM_2$ are similar with respect to the requirement that the words have to occur often together and more rarely within other contexts.

In this experiment, neither $AC_1$, nor $AC_2$ take into account pair frequency information. One way to assure that a selected pair gets a minimum number of counts is by setting an artificial threshold on the pair count. Also, with respect to the acoustic measures used in this experiment, there is no measure of the degree of "stickiness" (i.e., how often words co-occur together or stick together as in the second requirement) of a pair as it is the case for the language model oriented measures which increases the acoustic confusability since a frequent word can be part of many pairs now. Lastly, for the sake of comparison, FIG. 4C shows the performance of a set of 58 manually designed compound words suited for the voicemail recognition task.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of forming an augmented textual corpus associated with a speech recognition system, the method comprising the steps of:
    computing a measure for an element set in a textual corpus for comparison to a threshold value, the measure being an average of a direct n-gram probability value and a reverse n-gram probability value; and
    replacing the element set in the textual corpus with a compound element depending on a result of the comparison between the measure and the threshold value.

2. The method of claim 1, further comprising the steps of:
    computing a second measure for an element set in the textual corpus for comparison to a threshold value, the second measure being based on mutual information between elements in the set; and
    replacing the element set in the textual corpus with a compound element depending on a result of the comparison between the second measure and the threshold value.

3. The method of claim 1, further, comprising the steps of:
    computing a third measure for an element set in the textual corpus for comparison to a threshold value, the third measure being based on a comparison of the number of times a co-articulated baseform for the set is preferred over a concatenation of non-co-articulated individual baseforms of the elements forming the set; and
    replacing the element set in the textual corpus with a compound element depending on a result of the comparison between the third measure and the threshold value.

4. The method of claim 1, further comprising the steps of:
    computing a fourth measure for an element set in the textual corpus for comparison to a threshold value, the fourth measure being based on a difference between an average phone recognition score for a particular compound element and a sum of respective average phone recognition scores of the elements of the set; and
    replacing the element set in the textual corpus with the particular compound element depending on a result of the comparison between the fourth measure and the threshold value.

5. The method of claim 1, wherein the compound element is added to a language model vocabulary associated with the speech recognition system.

6. The method of claim 5, wherein a language model associated with the speech recognition system is recomputed based on the augmented textual corpus.

7. The method of claim 1, wherein at least one pronunciation variant of the compound element is added to an acoustic vocabulary associated with the speech recognition system.

8. The method of claim 7, wherein an acoustic model associated with the speech recognition system is retrained based on the augmented textual corpus.

9. The method of claim 1, wherein the element set is a pair of consecutive words in the textual corpus and the compound element is a compound word.

10. The method of claim 1, further comprising the steps of:
    computing an occurrence count for the element set; and
    comparing the occurrence count to a threshold value such that the measure is not computed for the set depending on a result of the occurrence count comparison.

11. The method of claim 1, wherein an output of the speech recognition system is a sequence of elements associated with the augmented textual corpus.

12. The method of claim 11, wherein the speech recognition system computes a score for a hypothesized sequence using a language model and an acoustic vocabulary augmented by one or more compound elements.

13. The method of claim 12, wherein the speech recognition system outputs the sequence with the highest score as the decoded sequence.

14. Apparatus for forming an augmented textual corpus associated with a speech recognition system, the apparatus comprising:
    a memory which stores a textual corpus;
    at least one processor operable to compute a measure for an element set in the textual corpus for comparison to a threshold value, the measure being an average of a direct n-gram probability value and a reverse n-gram probability value, and to replace the element set in the textual corpus with a compound element depending on a result of the comparison between the measure and the threshold value.

15. The apparatus of claim 14, wherein the processor is further operable to compute a second measure for an element set in the textual corpus for comparison to a threshold value, the second measure being based on mutual information between elements in the set, and to replace the element set in the textual corpus with a compound element depending on a result of the comparison between the second measure and the threshold value.

16. The apparatus of claim 14, wherein the processor is further operable to compute a third measure for an element set in the textual corpus for comparison to a threshold value, the third measure being based on a comparison of the number of times a co-articulated baseform for the set is preferred over a concatenation of non-co-articulated individual baseforms of the elements forming the set, and to replace the element set in the textual corpus with a compound element depending on a result of the comparison between the third measure and the threshold value.

17. The apparatus of claim 14, wherein the processor is further operable to compute a fourth measure for an element set in the textual corpus for comparison to a threshold value, the fourth measure being based on a difference between an average phone recognition score for a particular compound element and a sum of respective average phone recognition scores of the elements of the set, and to replace the element set in the textual corpus with the particular compound element depending on a result of the comparison between the fourth measure and the threshold value.

18. The apparatus of claim 14, wherein the compound element is added to a language model vocabulary associated with the speech recognition system.

19. The apparatus of claim 18, wherein a language model associated with the speech recognition system is recomputed based on the augmented textual corpus.

20. The apparatus of claim 14, wherein at least one pronunciation variant of the compound element is added to an acoustic vocabulary associated with the speech recognition system.

21. The apparatus of claim 20, wherein an acoustic model associated with the speech recognition system is retrained based on the augmented textual corpus.

22. The apparatus of claim 14, wherein the element set is a pair of consecutive words in the textual corpus and the compound element is a compound word.

23. The apparatus of claim 14, wherein the processor is further operable to compute an occurrence count for the element set, and to compare the occurrence count to a threshold value such that the measure is not computed for the set depending on a result of the occurrence count comparison.

24. The apparatus of claim 14, wherein an output of the speech recognition system is a sequence of elements associated with the augmented textual corpus.

25. The apparatus of claim 24, wherein the speech recognition system computes a score for a hypothesized sequence using a language model and an acoustic vocabulary augmented by one or more compound elements.

26. The apparatus of claim 25, wherein the speech recognition system outputs the sequence with the highest score as the decoded sequence.

27. An article of manufacture for forming an augmented textual corpus associated with a speech recognition system, comprising a machine readable medium containing one or more programs which when executed implement the steps of:

computing a measure for an element set in a textual corpus for comparison to a threshold value, the measure being an average of a direct n-gram probability value and a reverse n-gram probability value; and replacing the element set in the textual corpus with a compound element depending on a result of the comparison between the measure and the threshold value.

28. A method of forming an augmented textual corpus associated with a speech recognition system, the method comprising the steps of:

computing a measure for an element set in a textual corpus for comparison to a threshold value, the measure being based on a comparison of the number of times a co-articulated baseform for the set is preferred over a concatenation of non-co-articulated individual baseforms of the elements forming the set; and replacing the element set in the textual corpus with a compound element depending on a result of the comparison between the measure and the threshold value.

29. A method of forming an augmented textual corpus associated with a speech recognition system, the method comprising the steps of:

computing a measure for an element set in a textual corpus for comparison to a threshold value, the measure being based on a difference between an average phone recognition score for a particular compound element and a sum of respective average phone recognition scores of the elements of the set; and replacing the element set in the textual corpus with the particular compound element depending on a result of the comparison between the measure and the threshold value.

30. A method for use with a speech recognition system, the method comprising the steps of:

computing a measure for a pair of consecutive words in a textual corpus for comparison to a threshold value, the measure being an average of a direct bigram probability value and a reverse bigram probability value; and replacing the pair in the textual corpus with a compound word depending on a result of the comparison between the measure and the threshold value.

31. The method of claim 30, further comprising the steps of:

computing a second measure for a pair of consecutive words in the textual corpus for comparison to a threshold value, the second measure being based on mutual information between words in the pair; and replacing the word pair in the textual corpus with a compound word depending on a result of the comparison between the second measure and the threshold value.

32. The method of claim 30, further comprising the steps of:

computing a third measure for a pair of consecutive words in the textual corpus for comparison to a threshold value, the third measure being based on a comparison of the number of times a co-articulated baseform for the pair is preferred over a concatenation of non-co-articulated individual baseforms of the words forming the pair; and replacing the word pair in the textual corpus with a compound word depending on a result of the comparison between the third measure and the threshold value.

33. The method of claim 30, further comprising the steps of:

computing a fourth measure for a pair of consecutive words in the textual corpus for comparison to a threshold value, the fourth measure being based on a difference between an average phone recognition score for a particular compound word and a sum of respective average phone recognition scores of the words of the pair; and replacing the word pair in the textual corpus with the particular compound word depending on a result of the comparison between the fourth measure and the threshold value.

34. The method of claim 30, wherein the compound word is added to a language model vocabulary associated with the speech recognition system.

35. The method of claim 34, wherein a language model associated with the-speech recognition system is recomputed based on the textual corpus including the compound word.

36. The method of claim 30, wherein at least one pronunciation variant of the compound word is added to an acoustic vocabulary associated with the speech recognition system.

37. The method of claim 36, wherein an acoustic model associated with the speech recognition system is retrained based on the textual corpus including the compound word.

38. The method of claim 30, further comprising the steps of:
   computing an occurrence count for the word pair; and
   comparing the occurrence count to a threshold value such that the measure is not computed for the pair depending on a result of the occurrence count comparison.

39. The method of claim 30, wherein an output of the speech recognition system is a sequence of words associated with the textual corpus which includes one or more compound words.

40. The method of claim 39, wherein the speech recognition system computes a score for a hypothesized sequence using a language model and an acoustic vocabulary augmented by one or more compound words.

41. The method of claim 40, wherein the speech recognition system outputs the sequence with the highest score as the decoded sequence.

* * * * *